US012196098B2

(12) United States Patent
Gentle et al.

(10) Patent No.: US 12,196,098 B2
(45) Date of Patent: Jan. 14, 2025

(54) TURBINE HOUSING

(71) Applicant: Cummins Ltd, London (GB)

(72) Inventors: Christopher Gentle, Huddersfield (GB); David Michael Eastwood, Huddersfield (GB); Jonathan Dickson, Huddersfield (GB); Pravin Nirgude, Maharashtra (IN); Sarendra S. Gehlot, Maharashtra (IN); Kalpeshbapu Sonar, Maharashtra (IN)

(73) Assignee: Cummins Ltd, London (GB)

(*) Notice: Subject to any disclaimer, the term of this patent is extended or adjusted under 35 U.S.C. 154(b) by 0 days.

(21) Appl. No.: 18/610,034

(22) Filed: Mar. 19, 2024

(65) Prior Publication Data

US 2024/0318581 A1 Sep. 26, 2024

Related U.S. Application Data

(60) Provisional application No. 63/453,540, filed on Mar. 21, 2023.

(30) Foreign Application Priority Data

Apr. 4, 2023 (GB) .................................... 2305017

(51) Int. Cl.
*F01D 25/24* (2006.01)

(52) U.S. Cl.
CPC ........ *F01D 25/243* (2013.01); *F05D 2250/75* (2013.01)

(58) Field of Classification Search
CPC . F01D 9/02; F01D 9/026; F01D 17/16; F01D 25/24; F02C 6/12; F05D 2260/39; F05D 2240/40
See application file for complete search history.

(56) References Cited

U.S. PATENT DOCUMENTS 7,798,774 B2 * 9/2010 Allport ................. F02B 37/025 415/915
2009/0129920 A1 5/2009 Allport et al.
2013/0094953 A1 4/2013 Spathias
2018/0066541 A1 3/2018 Hara et al.
(Continued)

FOREIGN PATENT DOCUMENTS

CN 202266444 U 6/2012
CN 217300955 U 8/2022
(Continued)

OTHER PUBLICATIONS

GB Search Report for GB 2305017.2, filed Apr. 4, 2023, mailed Sep. 28, 2023.

*Primary Examiner* — David E Sosnowski
*Assistant Examiner* — Maxime M Adjagbe
(74) *Attorney, Agent, or Firm* — Faegre Drinker Biddle & Reath LLP

(57) ABSTRACT

There is disclosed a turbine housing for a turbomachine. The turbine housing comprises a volute which extends around an axis and defines at least part of a flow passage through the turbine housing. The flow passage extends from a first inlet opening. The turbine housing further comprises a flange that surrounds the first inlet opening, and an external surface that defines a rib. The rib defines a first portion that adjoins the flange, and a second portion that is angled with respect to the first portion.

19 Claims, 6 Drawing Sheets

(56) References Cited

U.S. PATENT DOCUMENTS

| | | | | |
|---|---|---|---|---|
| 2018/0216492 | A1 | 8/2018 | Azuma et al. | |
| 2020/0340393 | A1 | 10/2020 | Mcewen et al. | |
| 2022/0220893 | A1* | 7/2022 | Morton | F02C 7/06 |

FOREIGN PATENT DOCUMENTS

| | | | |
|---|---|---|---|
| GB | 2548393 | A | 9/2017 |
| WO | 2022229637 | A1 | 4/2022 |
| WO | 2024018218 | A1 | 1/2024 |

* cited by examiner

TURBINE HOUSING

CROSS-REFERENCE TO RELATED PATENT APPLICATIONS

The present application claims the benefit of priority to and is a U.S. Provisional Patent Application No. 63/453,540, filed Mar. 21, 2023 and GB Patent Application No. 2305017.2, filed Apr. 4, 2023, which are incorporated herein by reference in their entirety.

FIELD OF INVENTION

The present invention relates to a turbine housing for a turbomachine. The present invention also relates to a turbine comprising the turbine housing, and to a turbomachine comprising the turbine.

BACKGROUND

Turbochargers are well known devices for supplying air to the intake of an internal combustion engine at pressures above atmospheric pressure (boost pressures). A conventional turbocharger comprises an exhaust-gas-driven turbine wheel mounted on a rotatable shaft within a turbine housing. Rotation of the turbine wheel drives rotation of the compressor wheel mounted on the other end of the shaft within the compressor cover. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor. The turbine housing and compressor housings are typically mounted to the bearing housing.

In use, turbine housings are subject to stresses that result from both thermal and mechanical loading. The loading that turbine housings are subject to is cyclical, or vibrational, due to the nature of the operation of the turbocharger, and due to the nature of the system that turbochargers form a part of. Therefore, the design of a turbine housing should provide a turbine housing that is resistant to damage in use due to localised stresses, resonance, and/or thermomechanical fatigue.

The present invention seeks to obviate, or at least mitigate the problems associated with known turbine housing, whether identified herein or otherwise.

SUMMARY

In a first aspect of the invention there is provided a turbine housing for a turbomachine. The turbine housing comprises a volute which extends around an axis and defines at least part of a flow passage through the turbine housing. The flow passage extends from a first inlet opening. The turbine housing further comprises a flange that surrounds the first inlet opening, and an external surface that defines a rib. The rib defines a first portion that adjoins the flange, and a second portion that is angled with respect to the first portion.

The second portion may adjoin the first portion. The second portion may be offset from the first portion. The second portion of the rib may be disposed circumferentially adjacent to, or circumferentially offset from, the first portion of the rib.

The turbomachine may be a turbocharger. The turbomachine may be a supercharger. The turbomachine may be an electrically driven supercharger. The turbomachine may be an electric turbocharger.

The first inlet opening may be disposed at a first end of the flow passage.

The first portion of the rib may be non-linear in a projection onto a plane that is perpendicular to the radial direction. The radial direction may extend perpendicular to the axis. The entirety of the first portion may be non-linear. The second portion may be non-linear in a projection onto a plane that is perpendicular to the radial direction. The entirety of the second portion may be non-linear.

A boundary between the first portion and the second portion may be disposed at a predetermined distance along a path length of the rib. For example, the boundary between the first portion and the second portion may be disposed at one third of the path length of the rib from the point at which the first portion adjoins the flange, or half way along the path length of the rib.

The angle between the first portion and the second portion may be measured in a projection onto a plane that is perpendicular to the radial direction. The angle may be measured between a tangent to the first portion and a tangent to the second portion. The tangent to the first portion may be taken at the point at which the first portion adjoins the flange. The tangent to the second portion may be taken at a distal end of the second portion (where no third portion is provided). The tangent to the second portion may be taken at a midpoint of a path length of the second portion (where a third portion is provided). The path length may be understood to refer to length of the contour or path followed by the rib.

At least part, or all, of the first portion of the rib may be linear. At least part, or all, of the second portion of the rib may be linear. The linear portion of the first portion of the rib may be angled with respect to the linear portion of the second portion of the rib. Where at least part of the first portion is linear and at least part of the second portion is linear, the boundary between the first portion and the second portion may be at a midpoint along the contour followed by the rib between the linear section of the first portion and the linear section of the second portion.

The first portion and the second portion may be entirely linear. Where the first portion and the second portion are entirely linear, the boundary between the first portion and the second portion may be defined at the vertex between the first section and the second section.

Since the external surface defines a rib, the strength of the turbine housing, in particular in the region of the rib and of the flange, is improved relative to where no rib is provided. In use, the turbine housing is subject to external loading due to, for example, the weight of components, such as components of an after treatment system, coupled to the turbine housing. Therefore, improving the strength of the turbine housing advantageously improves the fatigue strength of the turbine housing, in particular in the region of the rib and of the flange. Improving the fatigue strength of the turbine housing advantageously reduces the likelihood of a failure occurring.

Furthermore, the rib advantageously increases the stiffness of the turbine housing. This advantageously increases the resonant frequency of the turbine housing. Turbomachines and the systems into which they are incorporated typically vibrate below their resonant frequency in use. Increasing the resonant frequency of the turbine housing is desirable because the likelihood of the turbine housing vibrating at its resonant frequency, i.e. undergoing resonance, is reduced. Were the turbine housing to undergo resonance, there would be a risk of damage to the turbine housing and/or to the system that it forms a part of. Therefore, the presence of the rib advantageously reduces the likelihood of damage to the turbine housing and/or to the system that it forms a part.

Since the second portion of the rib is angled with respect to the first portion, the impact of the rib on the circumferential flexibility of the housing is reduced as compared to if the second portion were not angled with respect to the first portion. Reducing the impact of the rib on the circumferential flexibility of the housing advantageously reduces the effect of thermomechanical stress on the turbine housing. Reducing the effect of thermomechanical stress on the turbine housing advantageously reduces the likelihood of a failure occurring.

The first portion of the rib may adjoin a radially outer portion of the flange.

Where the rib adjoins a radially outer portion of the flange, the rib is provided to the region of the turbine housing which benefits from an increase in the stiffness and strength.

The second portion may be angled with respect to the first portion in a projection onto a plane that is perpendicular to the radial direction.

The first portion may merge into the second portion in a continuous manner.

Where the first portion merges into the second portion in a continuous manner, the likelihood of a stress concentration occurring during use is reduced. Stress concentrations are undesirable as they can result in crack initiation. Therefore, the first portion merging into the second portion in a continuous manner advantageously reduces the likelihood of a crack initiating during use.

In a projection onto a plane that is perpendicular to the radial direction, the angle between the second portion and the first portion may be at least 15 degrees and up to 30 degrees.

The radial direction may extend perpendicular to the axis.

In a projection onto a plane that is perpendicular to the radial direction, the angle between the second portion and the first portion may be at least 15 degrees or up to 30 degrees.

Where, in a projection onto a plane that is perpendicular to the radial direction, the angle between the second portion and the first portion is at least 15 and up to 30 degrees, the circumferential flexibility provided by the rib is within an optimum range. If the circumferential flexibility is too great or too small, the turbine housing is susceptible to crack initiation, and ultimately failure of the turbine housing. Therefore, optimising the circumferential flexibility reduces the likelihood of failure of the turbine housing.

The rib may further define a third portion that is angled with respect to the second portion.

The third portion may adjoin the second portion. The third portion may be offset from the second portion. The third portion of the rib may be disposed circumferentially adjacent to, or circumferentially offset from, the second portion of the rib. The third portion may be angled with respect to the first portion.

The boundary between the second portion and the third portion may be disposed at a predetermined distance along the path length of the rib. For example, the boundary between the second portion and the third portion may be disposed at two thirds of the path length of the rib from the point at which the first portion adjoins the flange.

At least part, or all, of the third portion of the rib may be linear. The linear portion of the third portion of the rib may be angled with respect to the linear portion of the second portion of the rib. Where at least part, or all, of the second portion is linear and at least part, or all, of the third portion is linear, the boundary between the second portion and the third portion may be at a midpoint between the linear section of the second portion and the linear section of the third portion.

Where the second portion and the third portion are entirely linear, the boundary between the second portion and the third portion may be located at the point at which the path of the rib changes direction. At least part of the third portion may be linear. Where at least part of the third portion is linear, the boundary between the second portion of the rib and the third portion may be located at the midpoint between the linear section of the second portion and the linear section of the third portion.

The third portion of the rib may be disposed circumferentially adjacent to, or circumferentially offset from, the second portion of the rib.

Where the rib defines a third portion that is angled with respect to the second portion of the rib, the strength of the turbine housing is further improved. Furthermore, since, when provided, the third portion is angled with respect to the second portion, the effect of the presence of the rib on the circumferential flexibility of the housing is reduced.

The angle between the second portion and the first portion may be less than the angle between the third portion and the second portion.

The angle between the second portion and the first portion may be equal to the angle between the third portion and the second portion.

The angle between the second portion and the first portion may be measured in a projection onto a plane that is perpendicular to the radial direction. The angle between the third portion and the second portion may be measured in a projection onto a plane that is perpendicular to the radial direction. The angles referred to may be the acute angles that are formed between the portions of the rib.

The third portion may be angled with respect to the second portion in a projection onto a plane that is perpendicular to the radial direction.

The second portion may merge into the third portion in a continuous manner.

Where the second portion merges into the third portion in a continuous manner, the likelihood of a stress concentration occurring during use is reduced. Stress concentrations are undesirable as they can result in crack initiation. Therefore, the second portion merging into the third portion in a continuous manner advantageously reduces the likelihood of a crack initiating during use.

The angle between the third portion and the second portion may be at least 25 degrees and up to 45 degrees.

The angle between the second portion and the third portion may be measured in a projection onto a plane that is perpendicular to the radial direction. The angle between the second portion and the third portion may be measured between a tangent to the second portion disposed at a midpoint along a path length of the second portion, and a tangent to the third portion disposed at a distal end of the third portion. The midpoint of the path length of the second portion may define a point of inflection of the rib.

In a projection onto a plane that is perpendicular to the radial direction, the angle between the third portion and the second portion may be at least 25 degrees or up to 45 degrees.

A path followed by the rib may be generally S-shaped.

The rib may define a first curvilinear section.

The first curvilinear section may be arc-shaped.

The rib may define a second curvilinear section.

The second curvilinear section may be arc-shaped.

A centre of the first curvilinear section may be disposed on an opposite side of the rib to a centre of the second curvilinear section.

The first curvilinear section may define a first bend radius. The second curvilinear section may define a second bend radius. The magnitude of the first bend radius may be equal to the magnitude of the second bend radius.

The magnitude of the first bend radius may be greater than or less than the magnitude of the second bend radius.

Where the magnitude of first bend radius is equal to the magnitude of the second bend radius, a circumferential load applied to the rib is advantageously evenly distributed along the rib. This avoids stress concentrations occurring. Stress concentrations increase the likelihood of a crack forming. Therefore, the magnitude of the first bend radius being equal to the magnitude of the second bend radius advantageously reduces the likelihood of cracks forming.

The magnitude of the first and second bend radius may be at least 50 mm and/or up to 100 mm.

The flange may define an engagement surface. An angle between the first portion of the rib and the engagement surface may be at least 85 degrees and up to 95 degrees.

The angle between the first portion of the rib and the engagement surface of the flange may be measured in a projection onto a plane that is perpendicular to the radial direction. The angle between the first portion of the rib and the engagement surface of the flange may be measured between a tangent to the first portion of the rib at the point at which the rib adjoins the flange, and the engagement surface.

The rib may extend generally perpendicular to the radial direction.

A component of the length of the rib may extend generally perpendicular to the radial direction.

The rib may extend tangentially with respect to the circumferential direction.

A component of the length of the rib may extend tangentially with respect to the circumferential direction.

The rib may project in a radially outward direction.

The rib may be integrally formed with the turbine housing.

The turbine housing may be a thin-walled turbine housing.

A thin-walled turbine housing may be defined as a turbine housing having a wall thickness, for at least the volute, of less than around 5 mm at sidewalls thereof and/or less than around 6 mm at a circumferentially outer surface thereof (e.g. the combination of the sidewalls, and the circumferentially outer surface extending therebetween, defining a U-shape).

A thin-walled turbine housing may be defined as a turbine housing having a wall thickness, for at least the volute, of less than around 12%, more preferably less than around 10%, further preferably less than around 8%, of a minimum diameter of the diffuser. All wall thicknesses of at least the volute may be less than around 12%, more preferably less than around 10%, further preferably less than around 8%, of the minimum diameter of the diffuser. Alternatively, only a minimum wall thickness of at least the volute may be less than around 12%, more preferably less than around 10%, further preferably less than around 8%, of the minimum diameter of the diffuser. Wall thicknesses include thicknesses at sidewalls and/or a circumferentially outer surface of the housing. The minimum diameter of the diffuser may be located within the outlet portion distal the outlet opening (i.e. proximate a rear side of the housing).

A component of a length of the rib may extends in a generally circumferential direction.

The rib may also extend in directions other than the circumferential direction, such as the radial direction.

The length of the rib may extend tangentially with respect to the circumferential direction.

In a second aspect of the invention there is provided a turbine. The turbine comprises a turbine housing in accordance with the first aspect of the invention and a turbine wheel in the turbine housing.

In a third aspect of the invention there is provided a turbomachine. The turbomachine comprises a turbine according to the second aspect of the invention, a bearing housing configured to support a shaft for rotation about the axis, and a compressor. The compressor comprises a compressor housing in which a compressor wheel is received. The turbine wheel and the compressor wheel are in power communication.

The turbomachine may be a turbocharger. The turbomachine may be a supercharger. The turbomachine may be an electrically driven supercharger. The turbomachine may be an electric turbocharger.

BRIEF DESCRIPTION OF THE DRAWINGS

Embodiments of the present invention will now be described, by way of example only, with reference to the accompanying drawings, in which.

DETAILED DESCRIPTION

Figure 1:
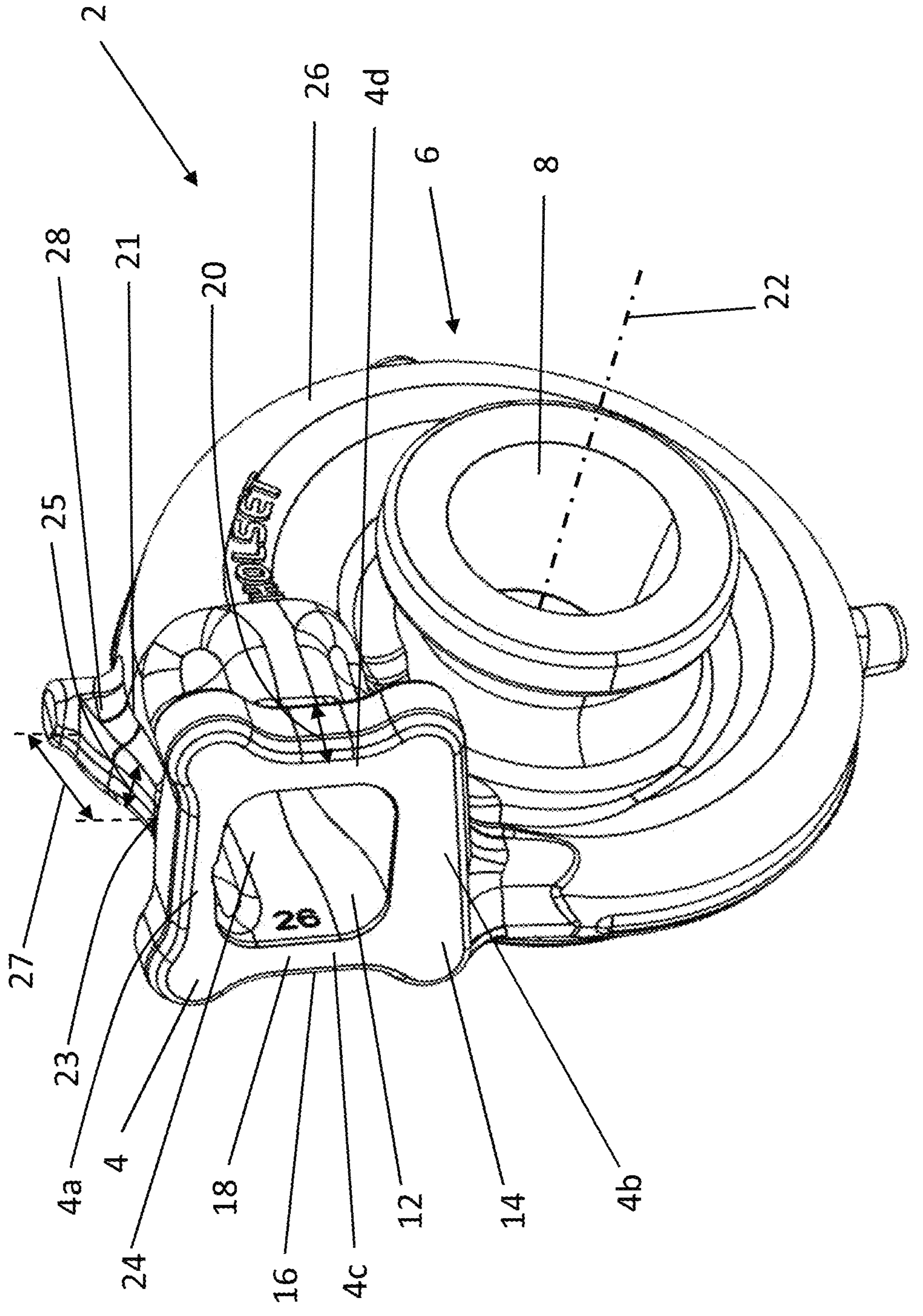
FIG. 1 shows a perspective view of a turbine housing according to an embodiment.

FIG. 1 is a perspective view of a turbine housing 2 in accordance with an embodiment of the present invention. FIG. 1 depicts the turbine housing 2 in an unfinished state, and may be subject to further processing such as, for example, sand blasting, shot peening or shot blasting, fettling, and/or machining. The turbine housing 2 comprises a flange 4, a volute 6 and an outlet opening 8. In use, the turbine housing 2 is secured to an adjacent bearing housing (at a rear side 3, visible in FIG. 2, of the turbine housing 2) and forms part of a turbocharger. The turbine housing 2 receives a turbine wheel (not shown) in a wheel chamber (not visible in FIG. 1—it is within the turbine housing 2).

In use, exhaust gas is expanded across the turbine wheel. The expansion of exhaust gases across the turbine wheel drives rotation of the turbine wheel which, in turn, drives rotation of a compressor wheel mounted to the same shaft as the turbine wheel. Such operation of turbochargers is well-known.

In some embodiments, the turbine housing 2 may be a thin-walled turbine housing. A thin-walled turbine housing may be defined as a turbine housing having a wall thickness, for at least the volute, of less than around 5 mm at sidewalls thereof and/or less than around 6 mm at a circumferentially outer surface thereof (e.g. the combination of the sidewalls, and the circumferentially outer surface extending therebetween, defining a U-shape).

A thin-walled turbine housing may be defined as a turbine housing having a wall thickness, for at least the volute, of less than around 12%, more preferably less than around 10%, further preferably less than around 8%, of a minimum diameter of the diffuser. All wall thicknesses of at least the volute may be less than around 12%, more preferably less than around 10%, further preferably less than around 8%, of the minimum diameter of the diffuser.

Alternatively, only a minimum wall thickness of at least the volute may be less than around 12%, more preferably less than around 10%, further preferably less than around 8%, of the minimum diameter of the diffuser. Wall thicknesses include thicknesses at sidewalls and/or a circumferentially outer surface of the housing 2. The minimum diameter of the diffuser may be located within the outlet portion distal the outlet opening (i.e. proximate a rear side of the housing).

The flange 4 defines a first inlet opening 12. The first inlet opening 12 may be the only such opening in the flange 4, or, in some embodiments, such as a twin-entry turbine housing, a plurality of inlet openings (e.g. two) may be defined in the flange 4. The flange 4 defines a first portion **4*a*, a second portion 4*b*, a third portion 4*c*, and a fourth portion 4*d*. The first portion 4*a* is disposed at a radially outer side of the first inlet opening 12. The first portion 4*a* may therefore be referred to as a radially outer portion of the flange 4. The second portion 4*b* is disposed at a radially inner side of the first inlet opening 12. The second portion 4*b* may therefore be referred to as a radially inner portion of the flange 4. The radially inner and radially outer references are with respect to the axis 22. It therefore follows that the first portion 4*a* is disposed further from the axis 22 than the second portion 4*b*. The third and fourth portions 4*c*, 4*d* are disposed on opposite sides of the first inlet opening 12 and extend between the first portion 4*a* and the second portion 4*b*. The flange 4 may be said to surround the first inlet opening 12. The first inlet opening 12 may otherwise be described as an inlet of the turbine housing 2. The first inlet opening 12 is defined in an engagement surface 14 that forms part of the flange 4. The engagement surface 14 is flat such that the entirety of the engagement surface 14 lies in a single plane. The flange 4 comprises a back face (not visible in FIG. 1—it is hidden by the remainder of the flange 4) that is generally opposed to the engagement surface 14**.

The engagement surface 14 of the flange 4 is defined by a periphery of material 18 that extends around the first inlet opening 12, between the first inlet opening 12 and an outer edge 16 of the engagement surface 14. Described another way, the engagement surface 14 is defined by a surface which is bound between the outer edge 16 and the first inlet opening 12. The periphery of material 18 may be described as a perimeter, or border, of sorts. One portion of the periphery of material is labelled 18 in FIG. 1.

The flange 4 extends by a thickness 20, which is around 15 mm in the illustrated embodiment. In other embodiments, the thickness 20 may be between around 10 mm and around 20 mm.

The volute 6 extends around an axis 22. The axis 22 may otherwise be described as an axis of rotation about which the turbine wheel (not visible in FIG. 1) rotates. The volute 6 is so-called because it refers to a generally spiralling geometry, and has a cross-section that varies along an extent of the volute 6. The volute 6 may be said to have a generally reducing, or tapering, cross section. The volute 6 defines part of a flow passage 24 through the turbine housing 2. The flow passage 24 may otherwise be described as a fluid pathway through the turbine housing 2. The flow passage 24 extends from the first inlet opening 12 (at a first end, or inlet, of the flow passage 24) to the outlet opening 8 at a second end of the flow passage 24. A cross-section of the flow passage 24 at the inlet end is therefore defined by the first inlet opening 12.

The housing 2 defines an external surface 26. The external surface 26 of the housing 2 may otherwise be described as an outer housing surface. The external surface 26 of the housing 2 defines a rib 28. The rib 28 projects from housing 2. The rib 28 projects from the housing 2 (i.e., from the portion of the external surface 26 of the housing 2 that is adjacent the rib 28) in a radially outward direction (i.e., away from the axis 22). The rib 28 defines a width 25 and a length 27. The length 27 is measured from a proximal end 23 of the rib 28 to a distal end 54 of the rib, and so is an effective length of the rib 28 (i.e., the length 27 is the minimum distance between the proximal end 23 and the distal end 54 of the rib 28). The proximal end 23 of the rib is the end of the rib 28 that adjoins the flange 4. The rib 28 also defines a path length, which is the length of the path or contour followed by the rib 28 from the proximal end 23 to the distal end 54 of the rib 28. It therefore follows that the path length is greater than the effective length of the rib 28. The width 25 is generally constant along the length 27 of the rib 28. In some embodiments, the width 25 is non-constant. The rib 28 may define a maximum width. The rib 28 may define a radially outermost point. The radially outermost point may be defined as the point of the rib 28 that is disposed furthest away from the axis 22. A ratio of the magnitude of the maximum width of the rib 28 to the magnitude of the radial distance from the axis 22 to a base 21 of the rib at a point corresponding to a maximum thickness of the rib 28 may be at least 0.1 and/or up to 0.2. The base 21 of the rib 28 is disposed at the interface between the rib 28 and the remainder of the external surface 26 of the housing 2. This ratio may be chosen based on, for example, the desired resonant frequency of the turbine housing 2, and/or the desired circumferential flexibility of the turbine housing 2. A direction of the rib 28 at a point along its length 27 refers to the direction of a tangent, viewed in a projection taken onto a plane that is perpendicular to the radial direction, to a midpoint of the width 25 at that point. The radial direction may extend perpendicular to the axis 22. This applies to any point along the length 27 of the rib 28. The rib 28 is integrally formed with the turbine housing 2. In other embodiments, the rib 28 may be separately formed from the turbine housing 2 and secured to the turbine housing using any suitable means, such as with use of an adhesive and/or welding.

Figure 2:
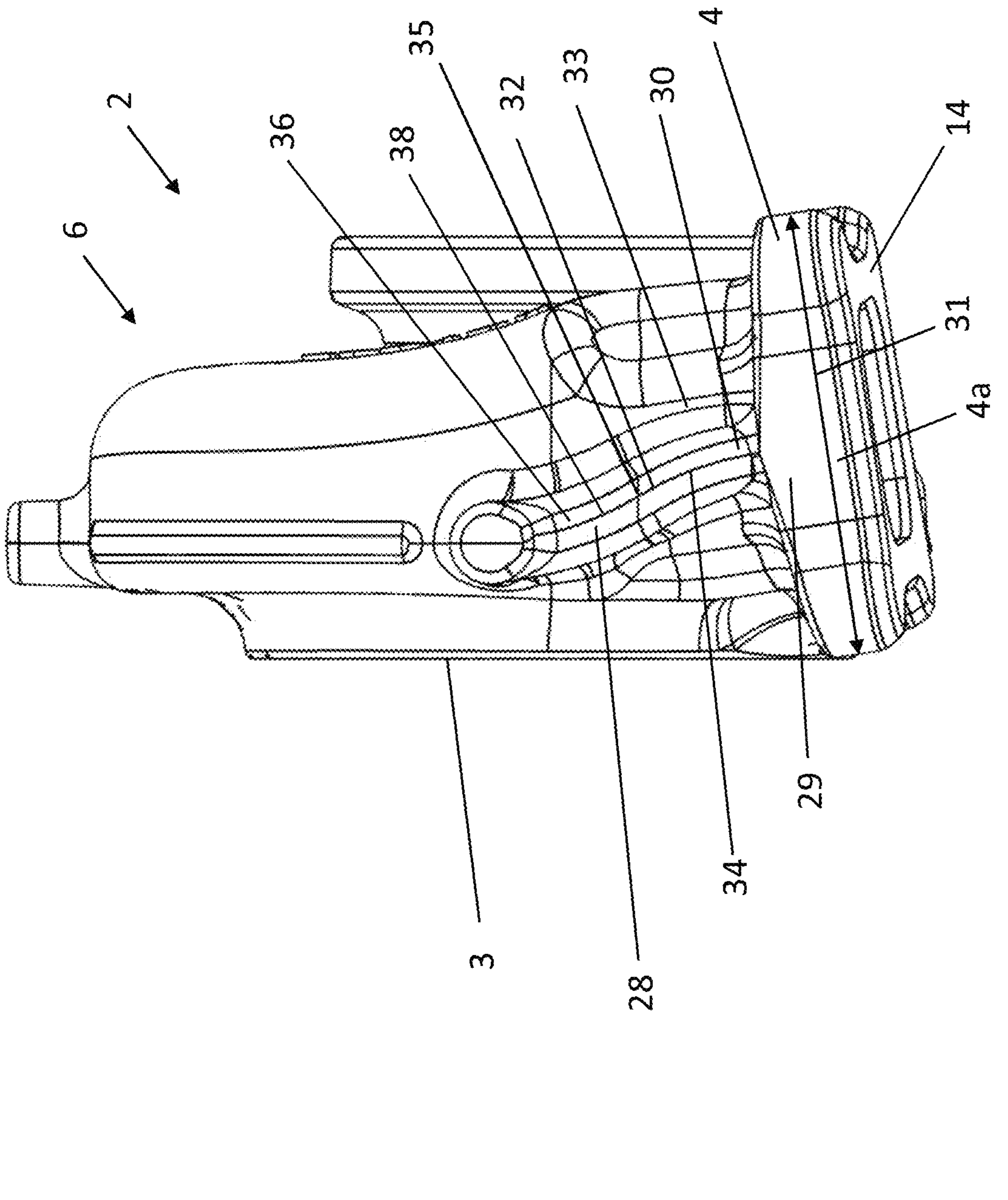
FIG. 2 shows a top view of the turbine housing of FIG. 1.

Referring now to FIG. 2. The rib 28 extends towards the rear side 3 of the turbine housing 2. That is to say, the distal end 54 of the rib 28 is closer to the rear side 3 than a proximal end 23 of the rib 28 in a direction parallel to the axis 22 (not shown in FIG. 2). However, in some embodiments, the rib 28 may extend towards the outlet opening of the turbine housing 2. The rib 28 adjoins the flange 4. In particular, the rib 28 adjoins a rear surface, which is opposed to the engagement surface 14, of the flange 4.

The rib 28 is generally S-shaped. The rib 28 defines a first arc section 34 and a second arc section 38. The first arc section 34 and the second arc section 38 adjoin one another. In some embodiments, the first and/or second arc section 34,

38 may be replaced with a section of a different curvilinear shape. For example, the first and/or second arc section 34, 38 may be replaced with a parabolic section. Therefore, the first arc section 34 may be referred to as a first curvilinear section, and the second arc section 38 may be referred to as a second curvilinear section. In other embodiments, the rib 28 may not define a first arc section 34 and/or a second arc section 38. The radius of the first arc section 34 is equal to the radius of the second arc section 38. However, in other embodiments, the radius of the first arc section 34 may be greater than the radius of the second arc section 38 or vice versa. The radii of the first arc section 34 and the second arc section 38 is 75 mm. However, in other embodiments, the radii of the first arc section 34 and of the second arc section 38 may be at least 50 mm and/or up to 100 mm. The magnitude of radii of the first arc section 34 and of the second arc section 38 being within this range reduces the likelihood of a stress concentration occurring during use, whilst allowing for adequate circumferential flexibility. Stress concentrations are undesirable because they can result in crack initiation, crack propagation, and ultimately failure of the turbine housing 2. In addition, the magnitude of the radii of the first arc section 34 and of the second arc section 38 may be chosen such that the rib 28 defines a continuous (i.e., without vertices) path. This advantageously improves the manufacturability of the turbine housing 2, as will be discussed below. The rib 28 is generally S-shaped. A centre of the arc defined by the first arc section 34 is disposed on an opposite side of the rib 28 to a centre the arc defined by the second arc section 38. Therefore, the rib 28 defines a point of inflection 35. The point of inflection 35 is disposed at the interface between the first arc section 34 and the second arc section 38. The point of inflection 35 may be said to be disposed at a midpoint along a path length of the second portion 32.

The rib 28 comprises a first portion 30. The first portion 30 of the rib 28 is non-linear. The entirety of the first portion 30 is non-linear. The first portion 30 of the rib 28 comprises a third of the path length of the rib 28. The first portion 30 of the rib 28 comprises at least part of the first arc section 34. The first portion 30 may be said to comprise two thirds of the path length of the first arc section 34. It is the first portion 30 of the rib 28 that adjoins the flange 4. The first portion 30 of the rib 28 adjoins a radially outer portion 29 (or first portion 4*a*) of the flange 4. The radially outer portion 29 of the flange 4 is disposed further from the axis 22 than a radially inner portion of the flange 4. Put another way, the first portion 30 of the rib 28 adjoins the first portion 4*a* of the flange. The rib 28 provides additional strength to a radially outer portion 33 of the housing 2. The rib 28 also increases the resonant frequency of the turbine housing 2. This is particularly advantageous where the turbine housing 2 is a thin-walled turbine housing. This is because thin-walled turbine housings have a lower resonant frequency than thicker-walled turbine housings. The first portion 30 of the rib 28 extends generally perpendicular to the flange 4. In particular, in a projection onto a plane that is perpendicular to the radial direction, a tangent to the first portion 30 at the point at which the first portion adjoins the flange 4 extends generally perpendicular to the engagement surface 14 of the flange 4. However, in some non-depicted embodiments, the angle between the tangent to the first portion 30 at the point at which the first portion 30 adjoins the flange 4, in particular the engagement surface 14 of the flange 4, may be at least 85 degrees and/or up to 95 degrees. This angle may be chosen based on, for example, a desired circumferential flexibility of the housing 2. This will be discussed in more detail below. The point at which the first portion 30 of the rib 28 adjoins the flange 4 is centrally located with respect to a width 31 of the flange 4. In some embodiments, the point at which the first portion 30 of the rib 28 adjoins the flange 4 need not be centrally located with respect to the width 31 of the flange 4.

The rib 28 further comprises a second portion 32. The second portion 32 of the rib 28 is non-linear. The entirety of the second portion 32 is non-linear. The second portion 32 adjoins the first portion 30. The second portion 32 of the rib 28 comprises a third of the path length of the rib 28. The second portion 32 comprises at least part of the first arc section 34 and at least part of the second arc section 38. Therefore, the point of inflection 35 is disposed on the second portion 32. The second portion 32 may be said to comprise a third of the path length of the first arc section 34 and a third of the path length of the second arc section 38. The second portion 32 of the rib 28 extends tangentially from the first portion 30 of the rib 28. That is to say, the second portion 32 of the rib 28 extends from the first portion 30 of the rib 28 in a continuous manner. In some embodiments, the second portion 32 of the rib 28 may extend from the first portion 30 of the rib 28 in a non-continuous manner. In some embodiments, the second portion 32 of the rib 28 may be spaced apart from the first portion 30 of the rib 28.

The second portion 32 of the rib 28 is angled with respect to the first portion 30 of the rib 28. The second portion 32 is angled with respect to the first portion 30 in a projection onto a plane that is perpendicular to the radial direction. The relevant radial direction may be defined by radial axis that extends through the rib 28. The relevant plane may be the plane as viewed in FIG. 2. The angle between the second portion 32 and the first portion 30 is measured in a projection onto a plane that is perpendicular to the radial direction. The angle between the second portion 32 and the first portion 30 is measured between a tangent to the first portion 30 at the point that the first portion 30 adjoins the flange 4 and a tangent to the second portion 32 at the point of inflection 35. The angle between the first portion 30 and the second portion 32 refers to the acute, not obtuse, angle that is formed between the tangents. The angle between the first portion 30 and the second portion 32 may be at least 15 degrees and/or up to 30 degrees. The angle between the second portion 32 of the rib 28 and the first portion 30 of the rib 28 may be chosen based on, for example, the desired circumferential flexibility of the housing 2. The second portion 32 may be angled with respect to the first portion 30 in a projection onto a plane that the axis 22 is perpendicular with respect to.

The rib 28 further comprises a third portion 36. The third portion 36 of the rib 28 is non-linear. The entirety of the third portion 36 is non-linear. The third portion 36 adjoins the second portion 32. The third portion 36 comprises a third of the path length of the rib 28. The third portion 36 of the rib 28 comprises at least part of the second arc section 38. The third portion 36 may be said to comprise two thirds of the path length of the second arc section 38. In some embodiments, the third portion 36 need not be provided. The third portion 36 extends tangentially from the second portion 32. That is to say, the third portion 36 extends from the second portion 32 in a continuous manner. In some embodiments, the third portion 36 of the rib 28 may be spaced apart from the second portion 32. In some embodiments, the third portion 36 of the rib 28 may extend from the second portion 32 of the rib 28 in a non-continuous manner.

In some embodiments, described in more detail below, the third portion need not be provided. That is to say, the rib 28 may comprise only the first portion 30 and the second portion 32. Where the rib 28 comprises only the first portion 30 and the second portion 32, the rib 28 defines only the first arc section 34. Whether the third portion 36 of the rib is provided may be determined based on a desired resonant frequency of the housing 2.

The third portion 36 of the rib 28 is angled with respect to the second portion 32 of the rib 28. The third portion 36 is angled with respect to the second portion 32 in a projection onto a plane that is perpendicular to the radial direction. The relevant radial direction may be defined by radial axis that extends through the rib 28. The relevant plane may be the plane as viewed in FIG. 2. The angle between the third portion 36 and the second portion 32 is measured in a projection onto a plane that is perpendicular to the radial direction. The angle between the third portion 36 and the second portion 32 is measured between a tangent to the third portion 36 at a distal end of the third portion 36 (i.e., an end of the third portion 36 that is opposed to the interface between the second portion 32 and the third portion 36) and a tangent to the second portion 32 at the point of inflection 35. The angle between the third portion 36 and the second portion 32 refers to the acute, not obtuse, angle that is formed between the portions. The angle between the third portion 36 of the rib 28 and the second portion 32 of the rib 28 may be at least 25 degrees and/or up to 45 degrees. In some embodiments, the angle between the second portion 32 and the first portion 30 of the rib 28 may be less than the angle between the third portion 36 and the second portion 32 of the rib 28. The angle between the third portion 36 of the rib 28 and the second portion 32 of the rib 28 may be chosen based on, for example, the desired circumferential flexibility of the housing 2. The third portion 36 may be angled with respect to the second portion 32 in a projection onto a plane that the axis 22 is perpendicular with respect to.

Figure 3:
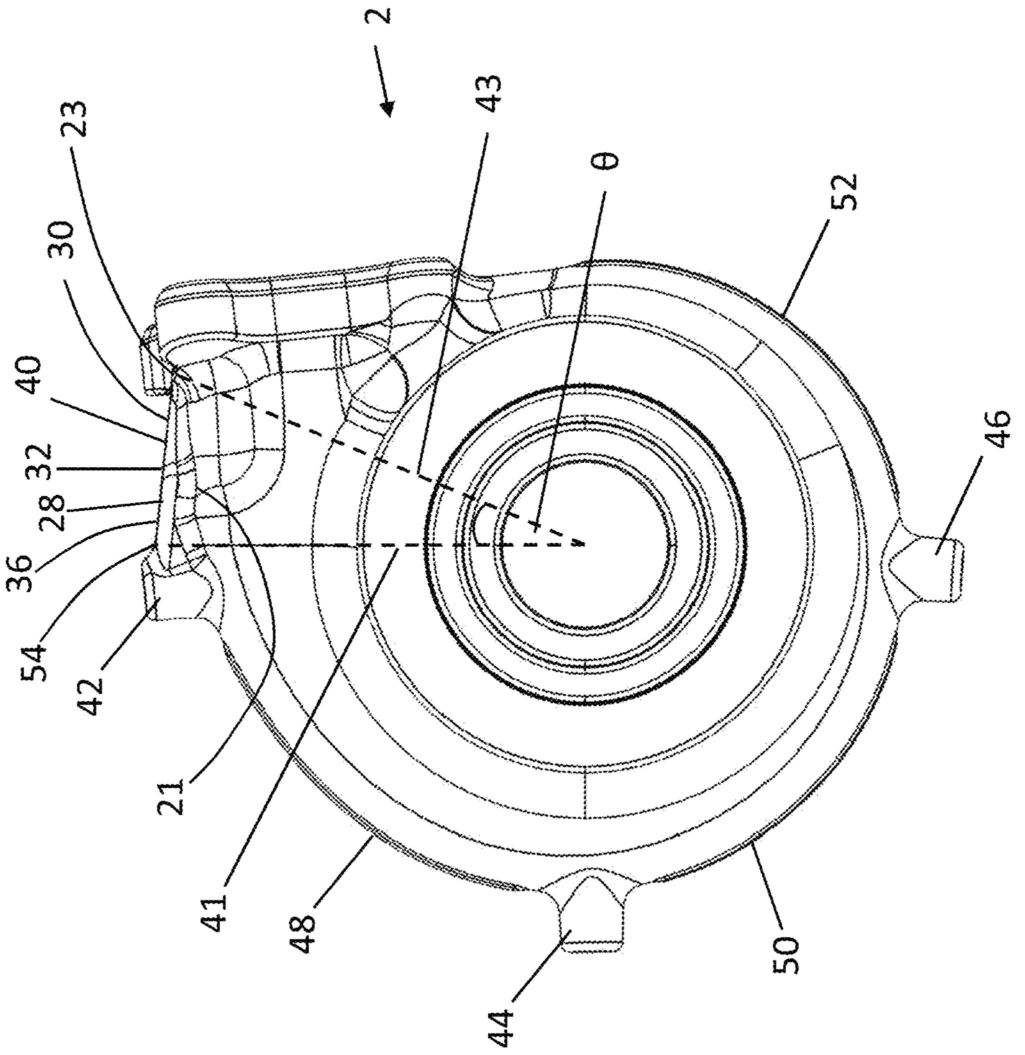
FIG. 3 shows a side view of the turbine housing of FIG. 1.

Referring now to FIG. 3, the rib 28 extends in a direction that is generally perpendicular to the radial direction. In particular, a radially outer surface 40 of the rib 28 extends in a direction that is generally perpendicular to the radial direction. The rib 28 therefore defines a radial thickness. The radial thickness of the rib 28 is the distance from a point of the external surface 26 of the housing 2 that is immediately adjacent the rib 28 to the radially outer surface 40 of the rib 28. The radially outer surface 40 may also be referred to as a top surface of the rib 28. Since the outer surface 40 of the rib 28 extends in a direction that is generally perpendicular to the radial direction, the radial thickness of the rib 28 increases from a proximal end of the first portion 30 to a distal end of the third portion 36. In addition, the radial thickness of the first portion 30 of the rib 28 is less than the radial thickness of the second portion 32 of the rib. In addition, the radial thickness of the second portion 32 of the rib 28 is less than the radial thickness of the third portion 36 of the rib 28. In addition, the radial thickness of the first portion 30 of the rib 28 is less than the radial thickness of the third portion 36 of the rib 28. In some embodiments, the radial thickness of the rib 28 may remain generally constant along the length of the rib. In some embodiments, the radial thickness of the rib 28 may decrease from a proximal end of the first portion 30 to a distal end of the third portion 36. The rib 28 may define a maximum radial thickness. The radial thickness of the rib 28 may be measured, in the radial direction, between the outer surface 40 of the rib 28 and the base 21 of the rib 28. A ratio of the magnitude of the maximum radial thickness of the rib 28 to the magnitude of the radial distance from the axis 22 to the base 21 of the rib 28 may be at least 0.01 and/or up to 0.2. This ratio may be chosen based on, for example, the desired resonant frequency of the turbine housing 2, and/or the desired circumferential flexibility of the turbine housing 2.

The rib 28 defines a central angle θ. The central angle θ extends between a first radial line 41 and a second radial line 43. The first radial line extends through the distal end 54 of the rib 28. The second radial line 43 extends through the proximal end 23 of the rib 28. The central angle θ may be at least 15 degrees and/or up to 55 degrees. The central angle θ may be at least 18 degrees and/or up to 54 degrees. The magnitude of the central angle θ may be chosen based on, for example, the desired circumferential flexibility of the turbine housing 2, and/or the desired resonant frequency of the turbine housing 2.

The turbine housing 2 further comprises a protrusion 42. The protrusion 42 adjoins the third portion 36 of the rib 28. The distal end 54 of the rib 28 is the end of the rib that adjoins the protrusion 42. The protrusion 42 is generally cylindrical. The protrusion 42 is integrally formed with the housing 2. The protrusion 42 functions as an attachment point for a heat shield. In some embodiments, the protrusion may not adjoin third portion 36 of the rib 28 but may instead be offset from the third portion 36 of the rib 28. Whether the third portion 36 of the rib 28 adjoins the protrusion 28 may be determined by the expected thermo-mechanical loading that the rib 28 and protrusion 42 will be subjected to in use. In some embodiments, the protrusion 42 need not be provided. Whether the protrusion 42 is provided may be determined by, for example, the heat that the turbine housing 2 will be subjected to during use. Where the protrusion 42 is not provided, the distal end 54 of the rib 28 is the end of the rib that is opposed to the proximal end 23 of the rib 28. The external surface 26 of the housing 2 defines two further protrusions 44, 46 that provide the same function as the protrusion 42. In some embodiments, the protrusions 44, 46 need not be provided.

The turbine housing 2 is formed by a casting process. To cast the turbine housing 2, two halves of a mould are brought together. The boundary between the two halves of the mould is referred to as a split line. The mould is then filled with molten metal to form the turbine housing 2. The external surface 26 of the housing 2 defines a circumferential protrusion 48. The circumferential protrusion 48 is spaced apart from the rib 28, and from the protrusion 42. The circumferential protrusion 48 is a product of the casting process that is used to form the turbine housing 2. The position of the circumferential protrusion 48 corresponds with the position of the split line of the mould used to form the turbine housing 2. The circumferential protrusion 48 may be referred to as a fettling bead. The circumferential protrusion 48 allows excess material, such as flash, to be removed following the casting process without reducing the minimum wall thickness of the turbine housing 2. The external surface 26 of the housing 2 further defines a second circumferential protrusion 50 and a third circumferential protrusion 52. In some embodiments, the housing 2 does not define any of the circumferential protrusions.

In some embodiments, the turbine housing 2 may be formed using any other suitable process. For example, the turbine housing 2 may be a fabricated turbine housing, and so may be formed using cutting techniques such as milling, and assembling processes such as welding.

Since the rib 28 defines a continuous path, the likelihood of defects, such as a misrun, occurring during the casting process is advantageously reduced. A misrun occurs where molten metal fails to reach all parts of the mould cavity. Discontinuous portions of a cast product increase the likelihood of a misrun occurring during the casting process. This is because discontinuous portions provide tight volumes to be filled, which the molten metal may be too viscous to fill or the molten metal may freeze before filling. Since the path followed by the rib 28 is continuous, the likelihood of a misrun occurring is advantageously reduced because the molten metal is able to better flow within the mould.

In some embodiments, in a plane perpendicular to the radial direction, a tangent to the distal end 54 of the rib 28 (i.e., an end of the rib 28 that is opposed to the flange 4) may extend parallel to the circumferential protrusion 48. This advantageously reduces the likelihood of defects forming at the distal end 54 of the rib 28.

In use, the turbine housing 2 is subjected to vibrational loading from a number of sources. For example, the turbine housing may be subjected to vibrations that originate from the engine of the vehicle that the turbine housing forms a part. Advantageously, the provision of the rib 28 increases the resonant frequency of the turbine housing. Increasing the resonant frequency of the turbine housing advantageously reduces the likelihood of the turbine housing vibrating at its resonant frequency in use. This advantage is particularly pronounced where the turbine housing 2 is a thin-walled turbine housing. This is because the resonant frequency for thin walled turbine housings is lower than the resonant frequency for thicker wall turbine housings. Therefore, the provision of the rib 28 where the turbine housing 2 is a thin walled turbine housing may counteract a reduction in natural frequency that results from the thin walls (compared with thicker walls).

The turbine housing 2 is subject to cyclical thermal loading due to the heat that is transferred from the exhaust gases passing through the flow passage 24 to the turbine housing. The cyclical thermal loading results in thermo-mechanical loading due to expansion and contraction of the turbine housing 2. Due to the shape of the volute 6, the thermo-mechanical loading predominantly acts in the circumferential direction. Advantageously, since the second portion 32 of the rib 28 is angled with respect to the first portion 30 of the rib 28 and the third portion 36 of the rib 28 is angled with respect to the second portion 32, the impact of the rib 28 on the circumferential flexibility of the housing is less than if the rib 28 were straight. Maintaining the circumferential flexibility of the housing 2 allows the housing to withstand the thermo-mechanical loading that it is subject to better than if the rib were straight.

Figure 4:
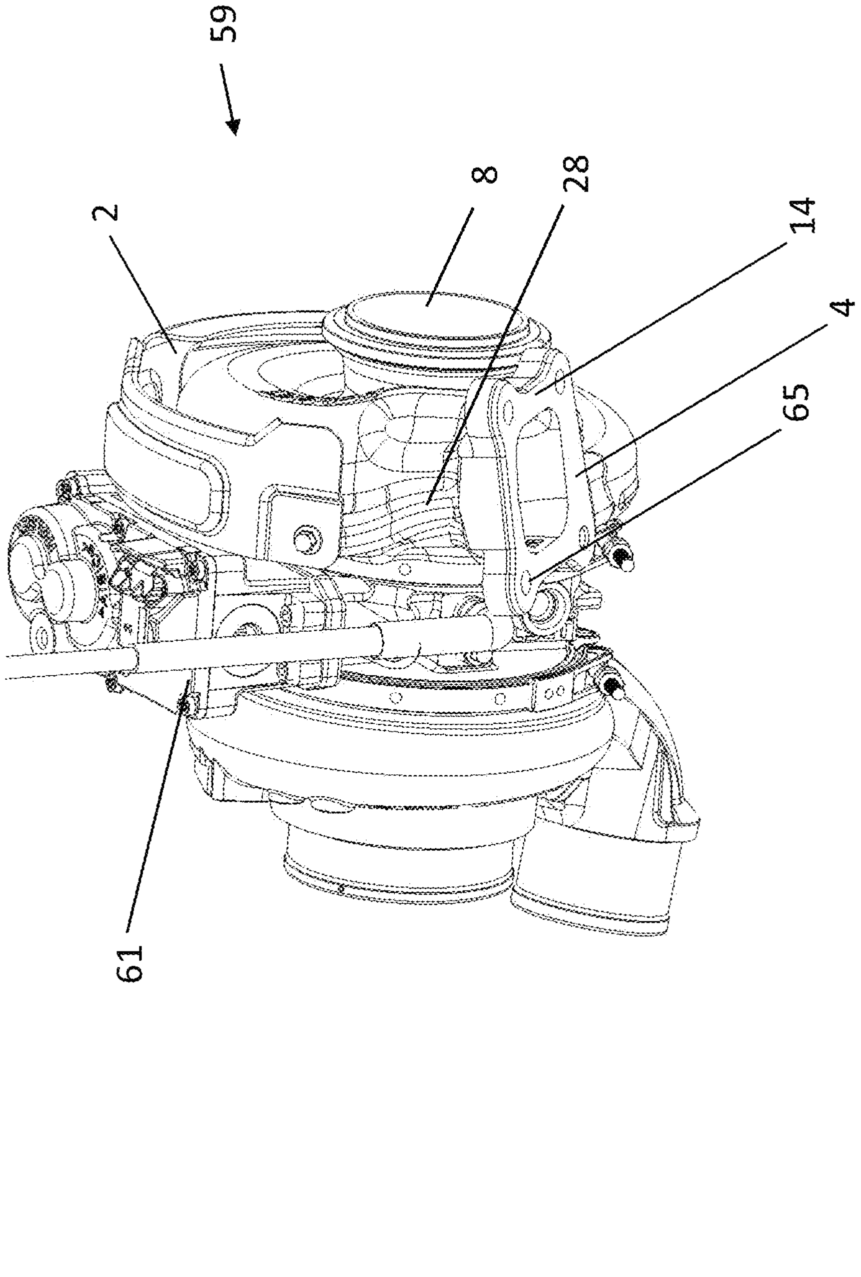
FIG. 4 shows a turbocharger that comprises the turbine housing of FIG. 1.

FIG. 4 shows a turbocharger 59 that comprises the turbine housing 2. As can be seen, the rib 28 is orientated such that it extends generally towards a bearing housing 61 of the turbocharger. However, in some embodiments, the rib may be orientated such that it extends generally away from the bearing housing of the turbocharger (i.e., towards the outlet opening 8). In other embodiments, the turbine housing 2 may form a part of any other turbomachine, such as, for example a supercharger, an electrically driven supercharger, or an electric turbocharger.

As can be seen from FIG. 4, the flange 4 has been provided with apertures 65 (only one of which is labelled in FIG. 4). The apertures 65 extend from the engagement surface 14 of the flange 4 to the back face of the flange (not visible in FIG. 4—it is hidden by the remainder of the flange). Fasteners, such as bolts, extend through the apertures in use to couple the turbocharger 59 to an exhaust gas manifold of an engine system. Where bolts are used, each bolt is secured to a corresponding nut. The back face of the flange 4 has been machined (e.g., milled) at the locations corresponding to the apertures 65. This allows the fasteners, such as the nuts or the heads of the bolts, to sit flat on the flange.

Figure 5:
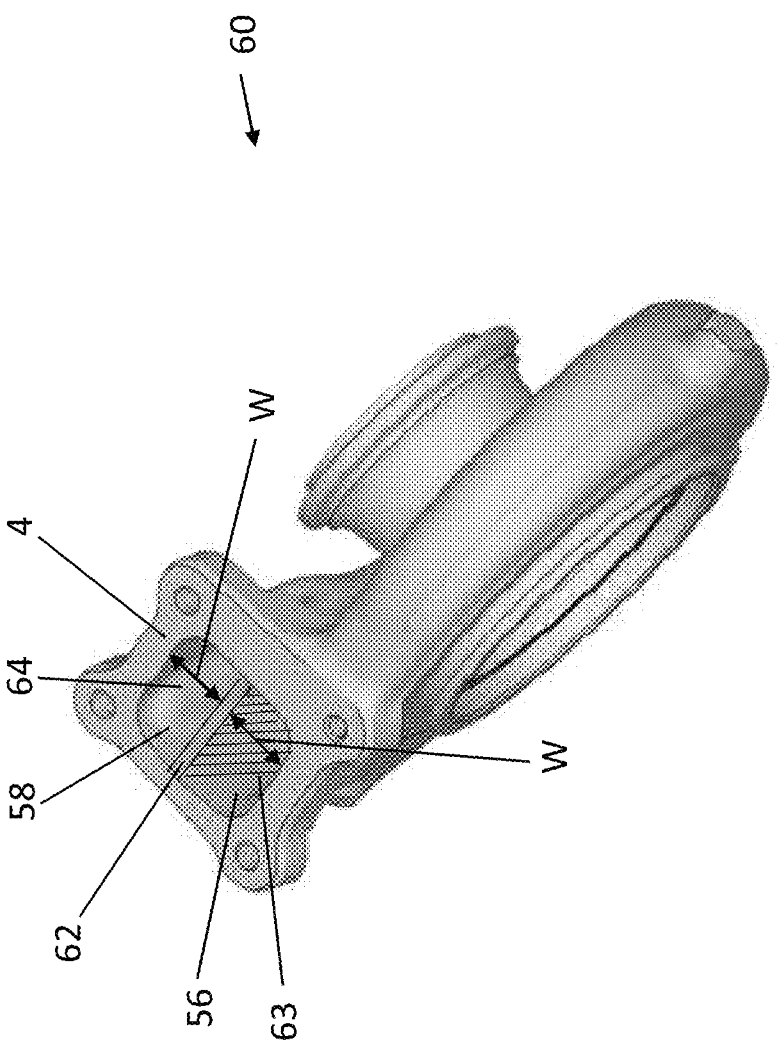
FIG. 5 shows a perspective view of the turbine housing from a different direction compared with FIG. 1.

FIG. 5 shows a second embodiment of the present invention. In this embodiment, a plurality of inlet openings 56, 58 are defined in the flange 4. Therefore, in this embodiment, the turbine housing 60 is a twin-entry turbine housing. The inlet openings 56, 58 are separated by a dividing wall 62. The dividing wall 62 also separates a first flow passage 63 from a second flow passage 64. The turbine housing 60 may have any combination of features discussed above in relation to the turbine housing 2 of FIGS. 1 to 3. In some embodiments, the turbine housing 60 may comprise two ribs 28. Where the turbine housing 60 comprises two ribs, the point at which each rib adjoins the flange 4 may be centrally disposed with respect to a width W of the inlet openings 56, 58. In other embodiments, one or both of the ribs 28 may be offset from the centre of the width W of the inlet openings 56, 58. The ribs 28 may be generally identical to one another. Alternatively, the ribs 28 may each comprise any combination of features disclosed herein, and so may differ in their width, length, number of arc portions, the angle(s) between the portions of the rib, or any other way.

FIGS. 6*a*-6*e* depict alternative paths that the rib may follow. Like numerals will be used for the ribs shown in FIGS. 6*a*-6*e*. The path followed by the rib may be understood to refer to the path followed in a projection onto a plane perpendicular to the radial direction by a line that follows a midpoint of the width of the rib. Unless otherwise stated, the features of the ribs shown in FIGS. 6*a* to 6*e* generally correspond with the features of the rib 28 described above.

Figure 6A:
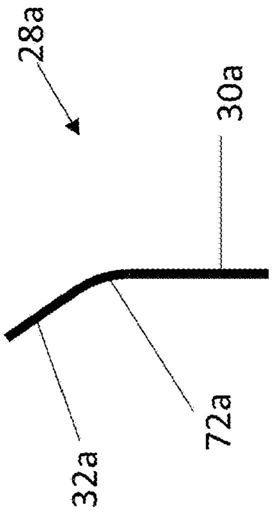
FIGS. 6*a* to 6*e* show alternative embodiments of the rib of the turbine housing of FIG. 1.

The rib 28*a* shown in FIG. 6*a* differs from the rib 28 in that the rib 28*a* comprises only a first portion 30*a* and a second portion 32*a*. That is to say, the rib 28*a* does not comprise a third portion. The rib 28*a* further differs from the rib 28 in that the first portion 30*a* and the second portion 32*a* of the rib 28*a* are linear. The entirety of the first portion 30*a* is linear. The entirety of the second portion 32*a* is linear. The first portion 30*a* and the second portion 32*a* are separated by a first curved portion 72*a*. The first curved portion 72*a* extends from the first portion 30*a* to the second portion 32*a* in a continuous manner. That is to say, there are no vertices at the boundaries between the first and second portions 30*a*, 32*a* and the first curved portion 72*a*.

The second portion 32*a* is angled with respect to the first portion 30*a*. The angle between the second portion 32*a* and the first portion 30*a* is measured in projection onto a plane that is perpendicular to the radial direction. The angle between the second portion 32*a* and the first portion 30*a* is measured between a line that is parallel to the first portion 30*a* and a line that is parallel to the second portion 32*a*. The angle between the first portion 30*a* and the second portion 32*a* refers to the acute, not obtuse, angle that is formed between the portions. The angle between the first portion 30*a* and the second portion 32*a* may be at least 15 degrees and/or up to 30 degrees.

Figure 6B:
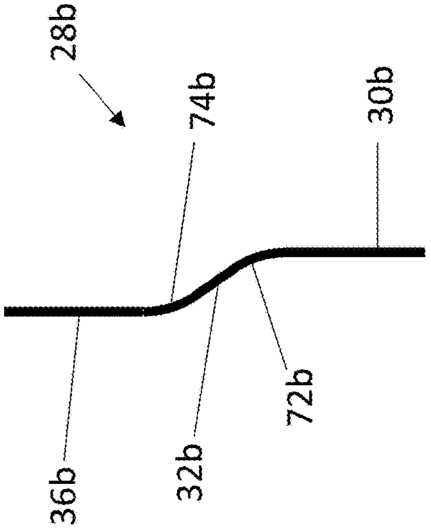

The rib 28*b* shown in FIG. 6*b* differs from the rib 28 in that the first portion 30*b*, the second portion 32*b*, and the third portion 36*b* of the rib 28*b* are linear. The entirety of the first portion 30*b* is linear. The entirety of the second portion 32*b* is linear. The entirety of the third portion 36*b* is linear. The first portion 30*b* and the second portion 32*b* are separated by a first curved portion 72*b*. The first curved portion 72*b* extends from the first portion 30*b* to the second portion 32*b* in a continuous manner. That is to say, there are no vertices at the boundaries between the first and second portions 30*b*, 32*b* and the first curved portion 72*b*.

The second portion 32*b* is angled with respect to the first portion 30*b*. The angle between the second portion 32*b* and the first portion 30*b* is measured in projection onto a plane that is perpendicular to the radial direction. The angle between the second portion 32*b* and the first portion 30*b* is measured between a line that is parallel to the first portion 30*b* and a line that is parallel to the second portion 32*b*. The angle between the first portion 30*b* and the second portion 32*b* refers to the acute, not obtuse, angle that is formed between the portions. The angle between the first portion 30*b* and the second portion 32*b* may be at least 15 degrees and/or up to 30 degrees.

The second portion 32*b* and the third portion 36*b* are separated by a second curved portion 74*b*. The second curved portion 74*b* extends from the second portion 32*b* and the third portion 36*b* in a continuous manner. That is to say, there is no vertex at the boundaries between the second and third portions 32*b*, 36*b* and the second curved portion 74*b*. The second portion 32*b* is angled with respect to the first portion 30*b*.

The third portion 36*b* is angled with respect to the second portion 32*b*. The angle between the third portion 36*b* and the second portion 32*b* is measured in projection onto a plane that is perpendicular to the radial direction. The angle between the third portion 36*b* and the second portion 32*b* is measured between a line that is parallel to the third portion 36*b* and a line that is parallel to the second portion 32*b*. The angle between the second portion 32*b* and the third portion 36*b* refers to the acute, not obtuse, angle that is formed between the portions. The angle between the second portion 32*b* and the third portion 36*b* may be at least 25 degrees and/or up to 45 degrees.

Although FIG. 6*b* shows the third portion 36*b* of the rib 28*b* as being parallel with the first portion 30*b* of the rib 28*b*, this need not be the case. Instead, the third portion 36*b* of the rib 28*b* may be angled with respect to the first portion 30*b* of the rib 28*b*.

Figure 6C:
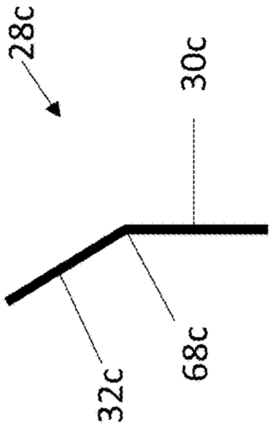

The rib 28*c* shown in FIG. 6*c* differs from the rib 28 in that the rib 28*c* comprises only a first portion 30*c* and a second portion 32*c*. That is to say, the rib 28*c* does not comprise a third portion. The rib 28*c* further differs from the rib 28 in that the first portion 30*c* and the second portion 32*c* of the rib 28*c* are linear. The entirety of the first portion 30*c* is linear. The entirety of the second portion 32*c* is linear. The rib 28*c* further differs from the rib 28 in that the rib 28*c* comprises a vertex 68*c* at the boundary between the first portion 30*c* and the second portion 32*c*. Therefore, the rib 28*c* is discontinuous along its length.

The second portion 32*c* is angled with respect to the first portion 30*c*. The angle between the second portion 32*c* and the first portion 30*c* is measured in projection onto a plane that is perpendicular to the radial direction. The angle between the second portion 32*c* and the first portion 30*c* is measured between a line that is parallel to the first portion 30*c* and a line that is parallel to the second portion 32*c*. The angle between the first portion 30*c* and the second portion 32*c* refers to the acute, not obtuse, angle that is formed between the portions. The angle between the first portion 30*c* and the second portion 32*c* may be at least 15 degrees and/or up to 30 degrees.

Figure 6D:
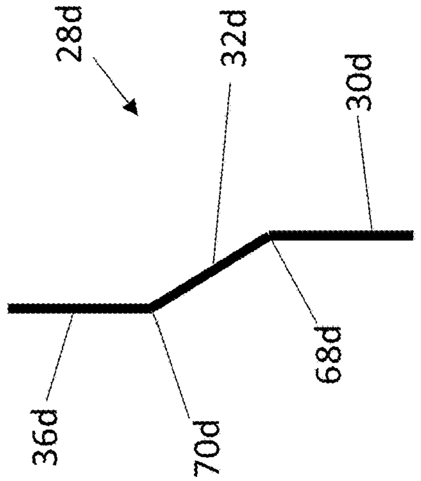

The rib 28*d* shown in FIG. 6*d* differs from the rib 28 in that the first portion 30*d*, the second portion 32*d*, and the third portion 36*d* of the rib 28*d* are linear. The entirety of the first portion 30*d* is linear. The entirety of the second portion 32*d* is linear. The entirety of the third portion 36*d* is linear. The rib 28*d* further differs from the rib 28 in that the rib 28*d* comprises a vertex 68*d* at the boundary between the first portion 30*d* and the second portion 32*d*. In addition, the rib 28*d* comprises a vertex 70*d* at the boundary between the second portion 32*d* and the third portion 36*d*. Therefore, the rib 28*d* is discontinuous along its length.

The second portion 32*d* is angled with respect to the first portion 30*d*. The angle between the second portion 32*d* and the first portion 30*d* is measured in projection onto a plane that is perpendicular to the radial direction. The angle between the second portion 32*d* and the first portion 30*d* is measured between a line that is parallel to the first portion 30*d* and a line that is parallel to the second portion 32*d*. The angle between the first portion 30*d* and the second portion 32*d* refers to the acute, not obtuse, angle that is formed between the portions. The angle between the first portion 30*d* and the second portion 32*d* may be at least 15 degrees and/or up to 30 degrees.

The third portion 36*d* is angled with respect to the second portion 32*d*. The angle between the third portion 36*d* and the second portion 32*d* is measured in projection onto a plane that is perpendicular to the radial direction. The angle between the third portion 36*d* and the second portion 32*d* is measured between a line that is parallel to the third portion 36*d* and a line that is parallel to the second portion 32*d*. The angle between the second portion 32*d* and the third portion 36*d* refers to the acute, not obtuse, angle that is formed between the portions. The angle between the second portion 32*d* and the third portion 36*d* may be at least 25 degrees and/or up to 45 degrees.

Although FIG. 6*d* shows the third portion 36*d* of the rib 28*d* as being parallel with the first portion 30*d* of the rib 28*d*, this need not be the case. Instead, the third portion 36*d* of the rib 28*d* may be angled with respect to the first portion 30*d* of the rib 28*d*.

Figure 6E:
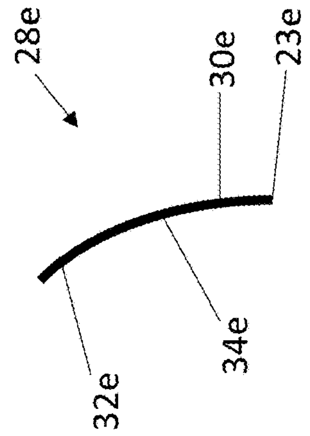

The rib 28*e* shown in FIG. 6*e* differs from the rib 28 in that the rib 28*e* comprises only a first portion 30*e* and a second portion 32*e*. That is to say, the rib 28*e* does not comprise a third portion. The rib 28*e* is non-linear. The entirety of the rib 28*e* is non-linear. The rib 28*e* follows an arc-shaped path. In some embodiments, the rib 28*e* may follow a different curvilinear path. For example, the path followed by the rib may be parabolic. The radius of the path followed by the rib 28*e* may be at least 75 mm and/or up to 200 mm.

The second portion 32*e* of the rib 28*e* is angled with respect to the first portion 30*e* of the rib 28*e*. The angled between the second portion 32*e* and the first portion 30*e* is measured in a projection onto a plane that is perpendicular to the radial direction. The angle between the second portion 32*e* and the first portion 30*e* is measured between a tangent to the first portion 30*e* at a proximal end 23*e* of the rib 28*e* and a tangent to the second portion 32*e* at a distal end of the rib 28*e*. The angle between the first portion 30*e* and the second portion 32*e* refers to the acute, and not obtuse, angle that is formed between the portions. The angle between the first portion 30*e* and the second portion 32*e* may be at least 15 degrees and/or up to 30 degrees.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

The invention claimed is:

1. A turbine housing for a turbomachine, the turbine housing comprising:

a volute which extends around an axis and defines at least part of a flow passage through the turbine housing, the flow passage extending from a first inlet opening;

a flange that surrounds the first inlet opening, the flange comprising a first portion, a second portion, a third portion, and a fourth portion, the first portion being disposed at a radially outer side of the first inlet opening, the second portion being disposed at a radially inner side of the first inlet opening, the third and fourth portions extending between the first and second portions; and an external surface that defines a rib;

wherein the rib defines a first portion that adjoins the first portion of the flange, and a second portion that is angled with respect to the first portion.

2. The turbine housing of claim 1, wherein the second portion is angled with respect to the first portion in a projection onto a plane that is perpendicular to a radial direction.

3. The turbine housing of claim 1, wherein the first portion merges into the second portion in a continuous manner.

4. The turbine housing of claim 1, wherein, in a projection onto a plane that is perpendicular to a radial direction, the angle between the second portion and the first portion is at least 15 degrees and up to 30 degrees.

5. The turbine housing of claim 1, wherein the rib further defines a third portion that is angled with respect to the second portion.

6. The turbine housing of claim 5, wherein the third portion is angled with respect to the second portion in a projection onto a plane that is perpendicular to a radial direction.

7. The turbine housing of claim 5, wherein the second portion merges into the third portion in a continuous manner.

8. The turbine housing of claim 5, wherein the angle between the third portion and the second portion is at least 25 degrees and up to 45 degrees.

9. The turbine housing of claim 5, wherein a path followed by the rib is generally S-shaped.

10. The turbine housing of claim 1, wherein the rib defines a first curvilinear section.

11. The turbine housing of claim 10, wherein the rib defines a second curvilinear section.

12. The turbine housing of claim 11, wherein the first curvilinear section defines a first bend radius and the second curvilinear section defines a second bend radius, and wherein the magnitude of the first bend radius is equal to the magnitude of the second bend radius.

13. The turbine housing of claim 12, wherein the magnitude of the first and second bend radius is at least 50 mm and/or up to 100 mm.

14. The turbine housing of claim 1, wherein the flange defines an engagement surface, and wherein an angle between the first portion of the rib and the engagement surface is at least 85 degrees and up to 95 degrees.

15. The turbine housing of claim 1, wherein the rib extends generally perpendicular to a radial direction; and/or wherein the rib projects in a radially outward direction; and/or wherein a component of a length of the rib extends in a generally circumferential direction.

16. The turbine housing of claim 1, wherein the rib is integrally formed with the turbine housing.

17. The turbine housing of claim 1, wherein the turbine housing is a thin-walled turbine housing.

18. A turbine comprising:

a turbine housing comprising:

a volute which extends around an axis and defines at least part of a flow passage through the turbine housing, the flow passage extending from a first inlet opening;

a flange that surrounds the first inlet opening, the flange comprising a first portion, a second portion, a third portion, and a fourth portion, the first portion being disposed at a radially outer side of the first inlet opening, the second portion being disposed at a radially inner side of the first inlet opening, the third and fourth portions extending between the first and second portions; and an external surface that defines a rib;

wherein the rib defines a first portion that adjoins the first portion of the flange, and a second portion that is angled with respect to the first portion;

a turbine wheel in the turbine housing.

19. A turbomachine comprising:

a turbine comprising:

a turbine housing comprising:

a volute which extends around an axis and defines at least part of a flow passage through the turbine housing, the flow passage extending from a first inlet opening;

a flange that surrounds the first inlet opening, the flange comprising a first portion, a second portion, a third portion, and a fourth portion, the first portion being disposed at a radially outer side of the first inlet opening, the second portion being disposed at a radially inner side of the first inlet opening, the third and fourth portions extending between the first and second portions; and an external surface that defines a rib;

wherein the rib defines a first portion that adjoins the first portion of the flange, and a second portion that is angled with respect to the first portion a turbine wheel in the turbine housing a bearing housing configured to support a shaft for rotation about the axis; and a compressor, the compressor comprising a compressor housing in which a compressor wheel is received;

wherein the turbine wheel and the compressor wheel are in power communication.

* * * * *